No. 768,562. Patented August 23, 1904.

UNITED STATES PATENT OFFICE.

ALPHONSO M. CLOVER, OF ANN ARBOR, MICHIGAN.

PROCESS OF FORMING ORGANIC PEROXID ACIDS.

SPECIFICATION forming part of Letters Patent No. 768,562, dated August 23, 1904.

Application filed December 26, 1903. Serial No. 186,749. (No specimens.)

*To all whom it may concern:*

Be it known that I, ALPHONSO M. CLOVER, a citizen of the United States, residing at Ann Arbor, in the county of Washtenaw and State of Michigan, have invented certain new and useful Improvements in Processes of Forming Organic Peroxid Acids, of which the following is a specification.

The invention relates to the manufacture of a class of compounds which may be designated as "organic peroxid acids" and which, as the title suggests, are characterized by possessing the properties of both a peroxid and an acid.

The process is applicable to the manufacture of various specific compounds of this class, of which the compound succinic peroxid acid may be taken as a specific case.

Broadly described, the process consists in the treatment of an anhydrid of a dibasic acid with a solution of hydrogen peroxid. This treatment is preferably effected by taking a suitable quantity of the pulverized anhydrid and mixing it with a solution of the hydrogen peroxid. The mixture is then agitated until a precipitate is formed which consists of the peroxid acid in pure condition.

For forming the specific compound succinic peroxid acid a quantity of the pulverized succinic anhydrid may be mixed with a seven-per-cent. solution of hydrogen peroxid, the proportion of the two ingredients being, by weight, preferably twenty-five to sixty-five. The mixture is then agitated for about thirty-five minutes, at the end of which period the precipitate is removed by filtration and is dried, preferably in vacuum. The reaction which takes place may be represented as follows:

The compounds formed by this process are characterized by their intense germicidal action, as well as by the other properties of peroxids. The specific compound succinic peroxid acid is a dibasic acid and has the formula $C_4H_6O_6$. It is further characterized by the following properties: It is moderately soluble in water, alcohol, acetone, and acetic ether. It is sparingly soluble in ethyl ether and is practically insoluble in chloroform and benzene. When the pure substance is heated in a thin-walled glass capillary tube, it begins to soften at about 115° centigrade and is completely melted at about 128°, with decomposition and evolution of gas. The substance consists of small colorless crystals, which have the form of flat plates.

What I claim as my invention is—

1. The herein-described process of forming organic peroxid acids which consists in treating an anhydrid of a dibasic acid with a solution of hydrogen peroxid.

2. The herein-described process of forming organic peroxid acids which consists in mixing a quantity of the pulverized anhydrid of a dibasic acid into a solution of hydrogen peroxid and agitating the same until precipitation takes place, and of then removing the precipitate.

3. The herein-described process of forming succinic peroxid acid which consists in mixing a quantity of the pulverized succinic anhydrid with a solution of hydrogen peroxid, in agitating the mixture to facilitate precipitation and in then removing the precipitate.

In testimony whereof I affix my signature in presence of two witnesses.

ALPHONSO M. CLOVER.

Witnesses:
 H. C. SMITH,
 JAS. P. BARRY.